(No Model.)

L. BEYER, Jr.
SWINGING SEAT FOR AGRICULTURAL IMPLEMENTS.

No. 542,133. Patented July 2, 1895.

WITNESSES:
Edward Thorpe
J. Fred Acker

INVENTOR
L. Beyer Jr.
BY
Munn & Co.
ATTORNEYS.

UNITED STATES PATENT OFFICE.

LOUIS BEYER, JR., OF CALUMET HARBOR, WISCONSIN.

SWINGING SEAT FOR AGRICULTURAL IMPLEMENTS.

SPECIFICATION forming part of Letters Patent No. 542,133, dated July 2, 1895.

Application filed March 19, 1895. Serial No. 542,351. (No model.)

*To all whom it may concern:*

Be it known that I, LOUIS BEYER, Jr., of Calumet Harbor, in the county of Fond du Lac and State of Wisconsin, have invented a new and Improved Swinging Seat for Agricultural Implements, of which the following is a full, clear, and exact description.

My invention relates to an improvement in swinging seats; and it has for its object to construct a seat especially adapted for use upon agricultural machines and to provide a seat which will be so pivoted on the machine and spring-controlled that it will adapt itself to inequalities in the ground, maintaining the seat always in a uniform position, and whereby, furthermore, the seat will not be affected by the motion of the machine.

Another object of the invention is to construct a swinging seat in such manner that it may be adjusted to suit riders of different weights.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1:
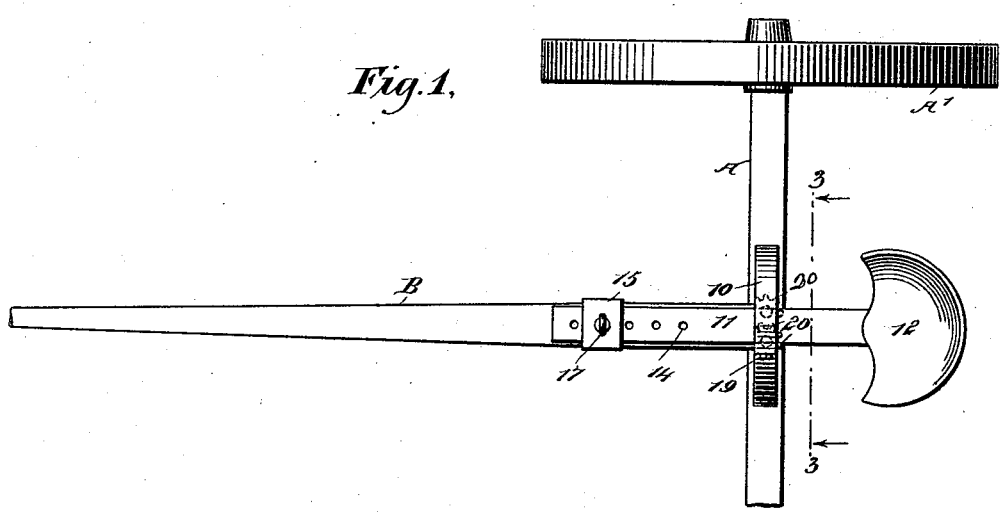
Figure 2:
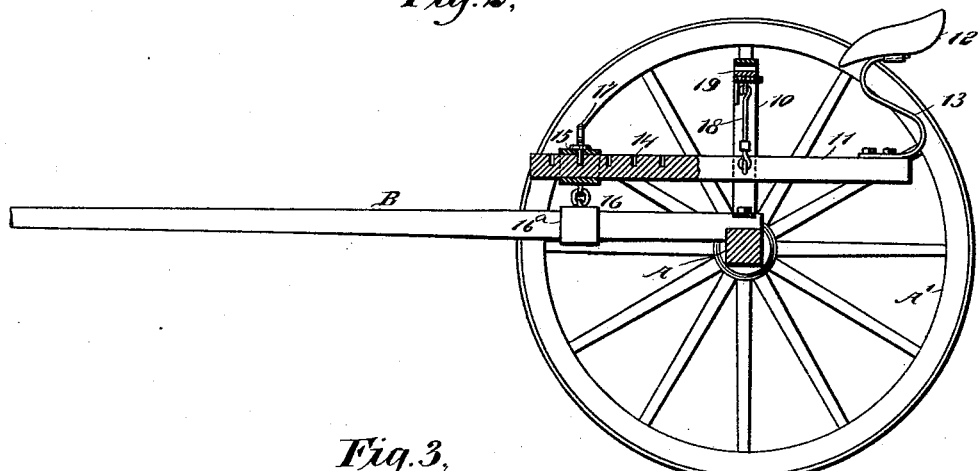
Figure 3:
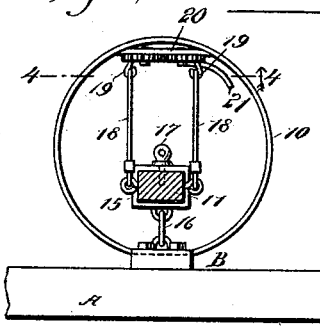
Figure 4:
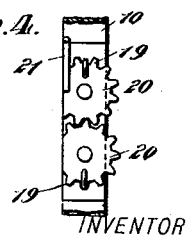

Figure 1 is a plan view of the improved seat and the support therefor. Fig. 2 is a central view through the support and a partial section through the side beam. Fig. 3 is a section taken substantially on the line 3 3 of Fig. 1, and Fig. 4 is a section substantially on the line 4 4 of Fig. 3.

In carrying out the invention the axle A may represent either the front or the rear axle of a truck carrying supporting-wheels A', and the beam B attached to the axle may represent either a reach, a tongue, or a connecting-bar between the forward and rear axle. A hoop or bow spring 10 is mounted upon the axle A or upon any other suitable support, and the seat-beam 11 is passed through this bow or hoop spring. In the drawings the seat-beam is shown located over the truck-beam B.

A seat 12, provided with an auxiliary spring-shank 13, is attached through the medium of its shank to the rear end of the aforesaid seat-beam, and in the forward portion of the seat-beam, preferably in the upper face, any desired number of openings or recesses 14 are produced, arranged in longitudinal order.

The forward or recessed end of the seat-beam is made to pass through a sleeve 15, which is connected by means of a link 16 or its equivalent to a sleeve $16^a$ loosely mounted upon the truck-beam B or whatever portion of the frame of the machine over which the forward end of the seat-beam may be placed. The sleeve 15 is provided with a set-screw or pin 17 adapted to enter and fit into any one of the openings 14 in the seat-beam. By moving the sleeves 15 and $16^a$ backward or forward the leverage of the seat may be changed, according as the seat is occupied by a person of light or heavy weight.

The bow or loop spring is the primary support for the seat-beam, and the connection between the two is preferably made by links 18. These links are secured to the seat-beam at opposite sides, as shown in Fig. 3, and may be coupled at their upper ends by eyes 18, or their equivalent, directly to the spring at each side of its center; but preferably the eyes are secured to meshing segmental gears 20, as shown in Fig. 4, horizontally located and journaled upon the upper portion of the bow-spring, one of the gears being provided with a handle 21. Thus it will be observed that the seat-beam will have swinging movement over the frame of the machine and will receive ample elasticity from the main or supporting-spring 10, and that no matter how rough the ground may be over which the machine is driven the seat will remain essentially level and will be unaffected by the motion of the machine proper.

By reason of the adjustable sleeves 15 and $16^a$ a rider of heavy or of light weight may be accommodated on the seat. When a heavy rider is seated, the sleeves are moved forward and away from the spring 10. When a lighter rider is seated, then the sleeves are moved backward or nearer to the spring 10, so that substantially the same tension may be brought to bear on the supporting-spring 10 for a light-weight or heavy-weight rider, each being equally comfortably seated.

In the event that the machine is to be used for hill-work, all of the pendulum swinging-spring movement of the seat may be preserved and the seat yet held horizontally by moving the gears 20 in a direction to carry the upper ends of the links 18 together to the center of the spring, and this may be accomplished without the rider leaving the seat and while the machine is in motion, owing to the handle 21.

Having thus described my invention, I claim as new and desire to secure by Letters Patent—

1. The combination with a supporting spring, of a seat beam suspended from the said spring, by links pivotally connected with the said beam and spring, said seat beam being provided with an anchoring device at one end and a seat at the opposite end, the spring support being between the anchor and seat, substantially as shown and described.

2. The combination, with a fixed auxiliary spring support, of a seat-supporting beam connected with the fixed support by an adjustable fulcrum and loosely suspended from the spring support, as and for the purpose specified.

3. The combination, with a frame and a spring support mounted on the frame, of a seat support having an adjustable fulcrum connection with the frame support, and pivotally suspended from the spring support, passing beyond both sides of the spring, as and for the purpose specified.

4. The combination, with a frame and a spring support mounted upon the frame, of a seat support, an adjustable fulcrum connecting the seat support to the frame, links suspending the seat support from the spring, and adjusting devices connected with the links, whereby they may be held parallel or made to converge at their upper ends, as and for the purpose specified.

5. The combination, with a frame and an arched spring secured on said frame, of a seat support having link connection with the spring and adjustable fulcrum connection with the frame support, substantially as described.

6. The combination, with a supporting frame and an arched spring secured thereto, of a seat support extending through the arched spring, an adjustable link connection between the seat support and the arched spring, and means, substantially as shown and described, for imparting a changeable fulcrum to the said seat support, as and for the purpose specified.

7. The combination, with a supporting frame, an arched spring secured to the said frame, and a sleeve provided with an adjusting screw held to slide upon the frame, of a seat support adjustably connected with the said sleeve, the said support being passed through the said arched spring, and links connecting the seat support with the said spring, as and for the purpose specified.

LOUIS BEYER, JR.

Witnesses:
CHARLES GUTHIER,
THEODORE MANDERSCHEID.